United States Patent [19]

Rice

[11] Patent Number: 5,452,197
[45] Date of Patent: Sep. 19, 1995

[54] STATIC DC TO AC POWER CONVERTER INCLUDING SEPARATE HIGH AND LOW POWER CONVERTERS

[75] Inventor: Milton W. Rice, Seattle, Wash.

[73] Assignee: Vanner Weldon, Inc., Hilliard, Ohio

[21] Appl. No.: 13,309

[22] Filed: Feb. 4, 1993

[51] Int. Cl.⁶ .......................................... H02M 3/335
[52] U.S. Cl. ...................................... 363/71; 363/49; 363/98; 363/132
[58] Field of Search ........................ 363/17, 49, 65, 71, 363/98, 132

[56] References Cited

U.S. PATENT DOCUMENTS

| | | | |
|---|---|---|---|
| 3,530,359 | 9/1970 | Grist | 219/130.3 |
| 4,349,772 | 9/1982 | Weiss | 318/799 |
| 4,471,422 | 9/1984 | Hierholzer, Jr. | 363/56 |
| 4,511,956 | 4/1985 | Dewan et al. | 363/49 |
| 4,587,604 | 5/1986 | Nerone | 363/17 |
| 4,660,137 | 4/1987 | Hotaka | 363/56 |
| 4,706,178 | 11/1987 | Hayashi | 363/98 |
| 4,794,506 | 12/1988 | Hino et al. | 363/25 |
| 4,951,185 | 8/1990 | Schutten et al. | 363/17 |
| 5,161,241 | 11/1992 | Kanai | 363/65 |
| 5,258,653 | 11/1993 | Perry | 363/65 |
| 5,262,933 | 11/1993 | Shyi-Hon | 363/49 |

Primary Examiner—Jeffrey L. Sterrett
Attorney, Agent, or Firm—Christensen, O'Connor, Johnson & Kindness

[57] ABSTRACT

Disclosed is a DC-to-AC power converter (10) that includes a high power DC-to-AC converter (20) and a low power DC-to-AC converter (40). The low power DC-to-AC converter produces a continuous 120-volt AC signal until a load sense circuit (60) determines that a load (14) is drawing more than a predetermined level of power. The load sense circuit then transmits a load sense signal to a control circuit (80) that disables the low power DC-to-AC converter and enables the high power converter. As a result, the DC-to-AC power converter is able to start virtually any load while conserving the power of a DC source.

7 Claims, 4 Drawing Sheets

STATIC DC TO AC POWER CONVERTER INCLUDING SEPARATE HIGH AND LOW POWER CONVERTERS

FIELD OF THE INVENTION

The present invention relates to power converters in general and to DC-to-AC power converters in particular.

BACKGROUND OF THE INVENTION

DC-to-AC power converters are commonly used to produce AC power from a DC source, such as a battery. Such DC-to-AC power converters are typically found on boats or utility trucks, where they can be used to power tools, microwave ovens, computers or any other device that requires AC power to operate.

In order to extend battery life, many DC-to-AC converters are designed to reduce the power dissipated within the converter itself when no load is present. One prior scheme to extend battery life has been to place a pair of back-to-back diodes in series with the an output lead of the converter. A resistor is connected between the battery and the diodes to bias the diodes to a minimum voltage (approximately 1.2 volts). Because the output impedance of the converter is low, the voltage provided by the diodes appears across the output leads of the converter. As a load draws current from the converter, a load sense circuit monitors a change in voltage across the resistor to detect the presence of a load and subsequently turns on the DC-to-AC converter. A problem with this approach is that the diodes do not provide a sufficient voltage to start some loads, such as fluorescent lights or electric equipment, and therefore the load sense circuitry is never triggered. Such a power converter has to be turned on manually in order to run the types of loads.

A second prior art method of saving battery power is to periodically turn on the DC-to-AC converter at full power for a brief period of time in order to detect the presence of a load. Each time the converter is turned on, a current monitoring circuit determines if a load is drawing current from the converter. If so, the converter is turned on to provide a continuous output signal. This method overcomes the problem of having an insufficient voltage to start certain loads. However, it has other problems. In order to save battery power, the number of AC cycles for which the power converter operates must be limited during each test pulse. This means that a user may experience some delay when turning on a load because the load may be plugged in between two test pulses. A second problem with this scheme is that some loads will not start until they are driven by an AC voltage that is present for a considerable number of continuous AC cycles. A user wishing to run such a load may again be required to turn on the power converter manually. Therefore, there is a need for a DC-to-AC converter that can start any load while still conserving battery power when no load is present. The present invention is directed to providing such a DC-to-AC power converter.

SUMMARY OF THE INVENTION

The present invention comprises a DC-to-AC power converter that produces an AC output voltage from a DC source. The power converter includes a high power converter and a low power converter. The low power converter provides a continuous AC output voltage until a load sense circuit determines that a load is drawing more than a predetermined amount of power. When the load draws more than the predetermined level of power, the load sense circuit sends a signal to a control logic block that turns off the low power converter and turns on the high power converter. Preferably, the low power converter is connected in series with the high power converter, but the low power converter may be connected in parallel with the high power converter if the output impedance of the high power converter is large.

The present invention is also directed to a switching circuit that produces an AC voltage signal from a DC voltage source. The switching circuit includes four electrically controlled switches that are driven by a pulse width modulation circuit to first conduct current through an isolation transformer in a first direction and then conduct current through the transformer in an opposite direction in order to produce a 120-volt AC output signal.

BRIEF DESCRIPTION OF THE DRAWINGS

The foregoing aspects and many of the attendant advantages of this invention will become more readily appreciated and better understood by reference to the following detailed description, taken in conjunction with the accompanying drawings, wherein.

DETAILED DESCRIPTION OF THE PREFERRED EMBODIMENT

Figure 1:
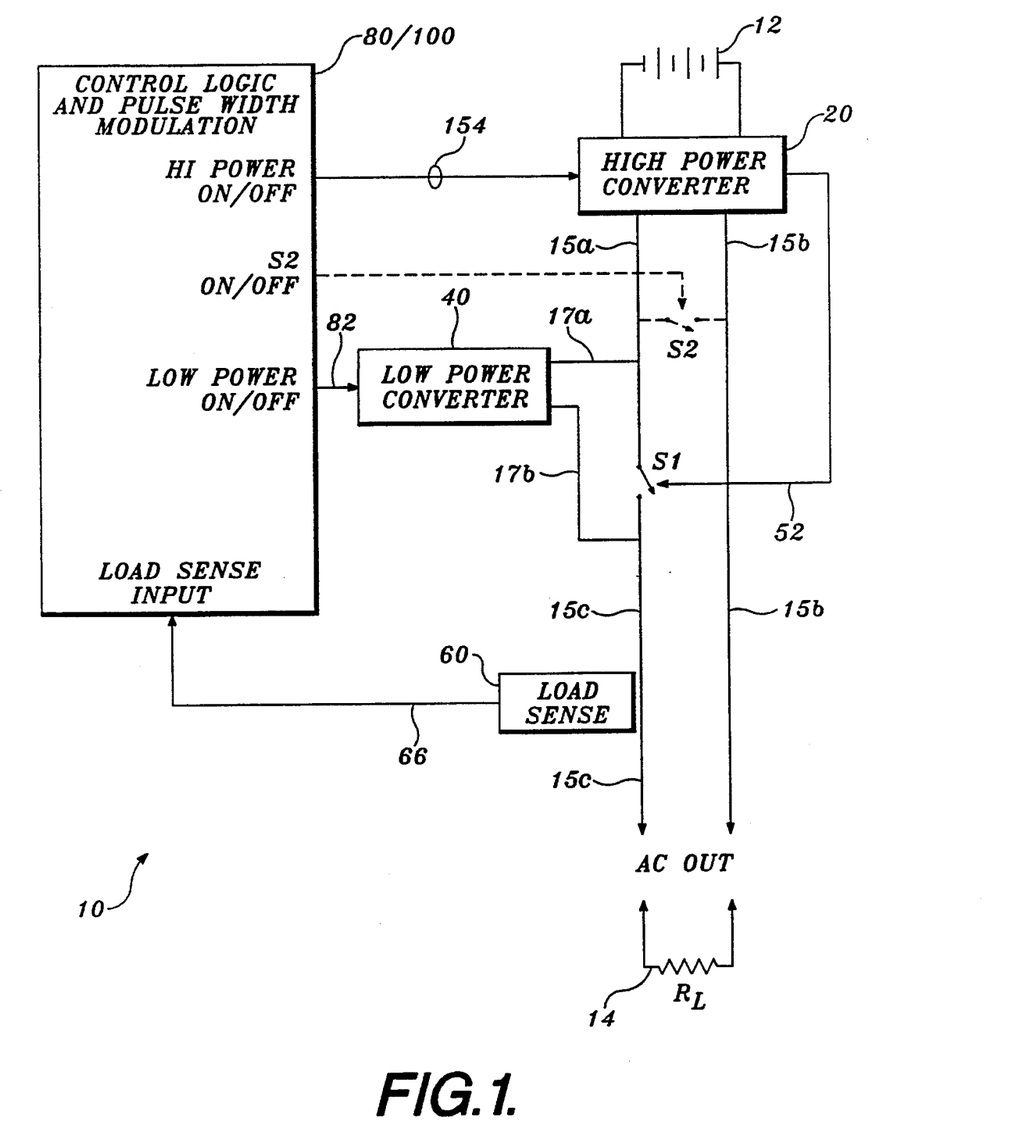
FIG. 1 is a block diagram of a DC-to-AC power converter according to the present invention.

A block diagram of a DC-to-AC power converter 10 according to the present invention is shown in FIG. 1. The DC-to-AC power converter includes a high power converter 20, a low power converter 40, a battery 12, a control logic and pulse width modulation circuit 80/100 and a load sense circuit 60. The low power converter provides a continuous 120-volt AC output voltage or a substantial portion of 120-volt AC to a load 14 until the load sense circuit determines that a load is drawing more than a predetermined amount of power. At this time, the circuit 80/100 turns the low power converter 40 off and turns on the high power converter 20 to provide a high power AC output voltage to the load.

As described in greater detail below, the DC-to-AC power converter 10 solves the problems associated with prior art DC-to-AC converters. First, the low power converter 40 only draws a minimum amount of power from the battery 12, thereby prolonging the life of the battery when the load is relatively small. Secondly, the high power converter 20 is available to produce 120-volt AC that can start virtually any larger load.

As described above, the power converter 10 provides a load 14 with a 120-volt AC voltage signal. The DC-to-AC power converter is powered by a DC source, such as a 12-volt automobile or marine battery 12. The power converter 10 includes a high power converter 20 that provides a 120-volt AC signal on a pair of leads 15a and 15b. A switch S1, when closed, connects the lead 15a to a lead 15c, thereby connecting the AC signal produced by the high power converter 20 to the load 14. When the switch S1 is open, the AC signal produced by the high power converter 20 is disconnected from the load 14. By way of example, the high power converter 20 may be designed to be able to deliver up to 1,200 watts of power to the load 14. In contrast, the low power converter 40 can deliver up to 10 watts of power to the load.

The low power converter 40 produces a 120-volt AC signal on a pair of leads 17a and 17b. Lead 17a is connected to lead 15b, while lead 17b is connected to lead 15c. When the switch S1 is open, the 120-volt AC output signal produced by the low power converter 40 is applied to the load 14 via the leads 15b and 15c. Thus, when the switch S1 is closed, the leads 17a and 17b are shorted together and the output signal of the low power converter 40 is not applied to the load 14.

If the output impedance of the high power converter 20 is low, then the output of the low power converter 40 that appears on lead 17a also appears on lead 15b. However, if the output impedance of the high power converter 20 is relatively high, power may be lost as the output signal from the low power converter 40 is transmitted from lead 17a to lead 15b. In this case, a second switch S2 may be employed to short the leads 15a and 15b when the low power converter is on. The switch S1 is controlled by the high power converter 20 so that when the high power converter 20 is on, the switch S1 is closed, and when the low power converter 40 is on the switch S1 is open. In the preferred embodiment of the present invention, switches S1 and S2 are solid state devices such as triacs, although other high current devices could be used.

As described above, the low power converter 40 supplies a continuous 120-volt AC output voltage across the leads 15b and 15c until the load 14 draws more than a predetermined level of power. The load sense circuit 60 determines if the load 14 is drawing more than the predetermined amount of power. When the power drawn exceeds the predetermined level, a signal is sent on a lead 66 to the control logic and pulse width modulation block 80/100 to turn off the low power converter 40, open switch S2 (if used) and turn on the high power converter 20. The high power converter 20 then provides the load 14 with a high power 120-volt AC voltage. With the two power converters 20 and 40, a continuous 120-volt AC output voltage is provided that is sufficient to drive virtually any load while conserving the power of the DC source when no load is present.

Figure 2:
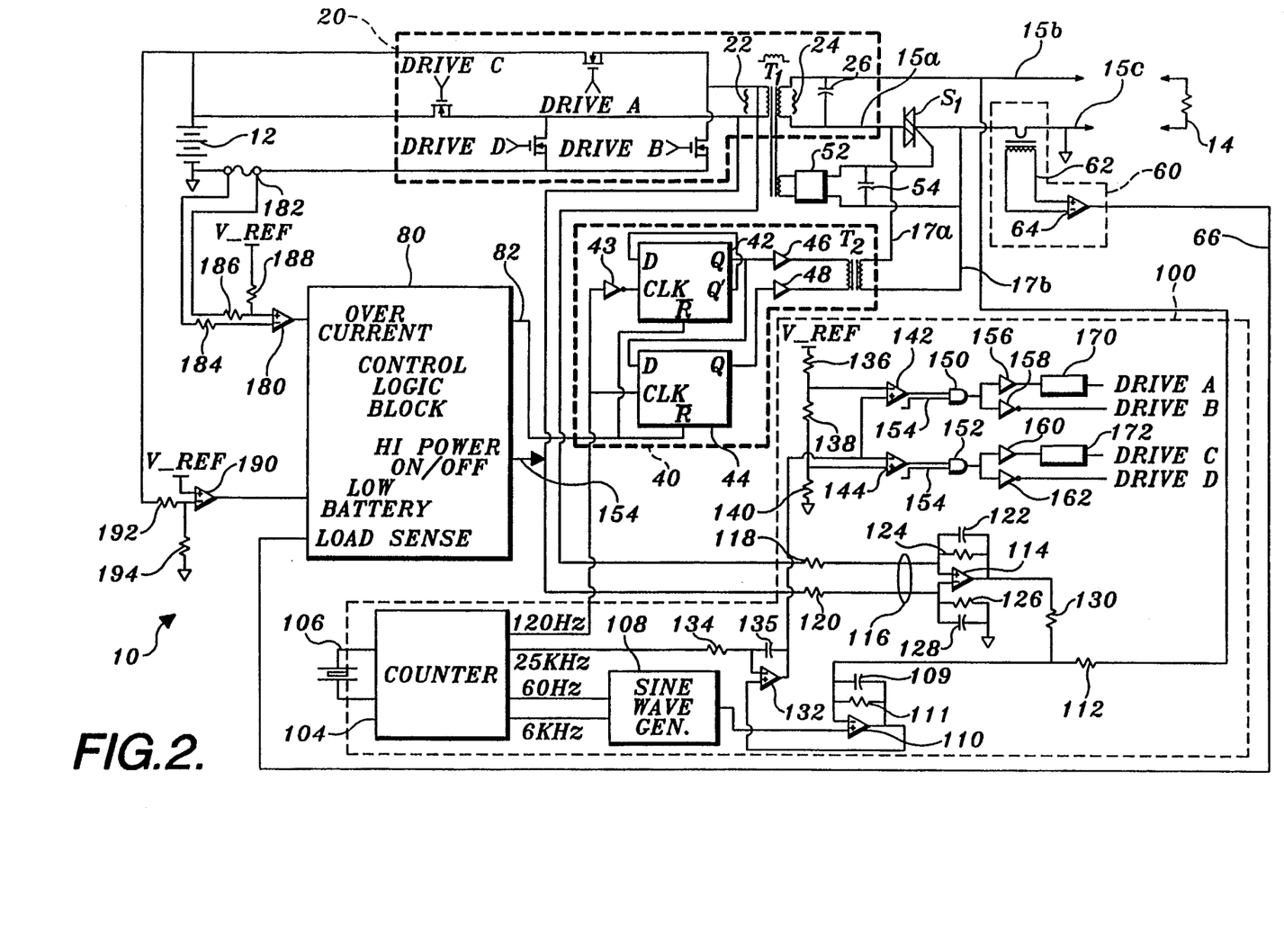
FIG. 2 is a more detailed circuit diagram of the DC-to-AC power converter shown in FIG. 1.

A more detailed circuit diagram of the DC-to-AC converter 10 according to the present invention is shown in FIG. 2. The DC-to-AC converter 10 produces a 120-volt, 60 Hz AC output voltage signal from a DC source 12 (i.e., a battery). The AC output voltage is supplied to the load 14, which is connected across the output leads 15b and 15c. The DC-to-AC converter 10 according to the present invention includes five major circuit components: a high power converter 20, a low power converter 40, a load sense circuit 60, a control logic circuit 80, and a pulse width modulation circuit 100. In the preferred embodiment of the present invention, the control logic block 80 comprises a microprocessor and memory in which is stored an accompanying computer program, as is well known to those skilled in the art. However, discrete components could be used.

As described above, when the switch S1 is open, the output voltage from the low power converter 40 appears across the output leads 15b and 15c of the DC-to-AC converter 10. The low power converter 40 includes a pair of D-type flip-flops 42 and 44. A 120 Hz clock signal received from a counter circuit 104 is connected to a clock input of the D flip-flop 44 and to an inverter gate 43, which in turn drives a clock input of flip-flop 42 so that both flip-flops change states alternately in time. A D input of flip-flop 42 is connected to a Q' output of the flip-flop 42 such that a Q output of the flip-flop alternates between a logic high state and a logic low state. The Q output of flip-flop 42 is also connected to the D input of flip-flop 44 so that the state of flip-flop 44 lags the output state of flip-flop 42 by 90°. The Q output of flip-flop 42 is connected to a driver circuit 46 to drive current through a primary winding of a transformer T2 in a first direction, while the Q output of flip-flop 44 is connected to a driver 48 to drive current through the primary winding of transformer 42 in an opposite direction. Transformer T2 includes a secondary winding having a sufficient number of turns to produce a 120-volt pseudosine wave across the leads 17a and 17b.

Connected between the leads 17a and 17b, in series with the output leads 15a and 15c, is the switch S1 shown in FIG. 1. When the low power converter 40 is providing the output voltage across the leads 15b and 15c, the switch S1 is open. Because the high power converter 20 has a low output impedance, the additional switch S2 shown in FIG. 1 is not necessary. However, if the output impedance were sufficiently high, such a switch may be necessary. When the low power converter 40 is not operating, the switch S1 is closed, shorting the output leads 17a and 17b of the low power converter 40. With the switch S1 closed, the high power converter 20 supplies the output voltage signal across the leads 15b and 15c.

As described above, the low power converter 40 supplies a continuous 120-volt AC output voltage signal across the leads 15b and 15c until the power drawn by the load 14 exceeds a predetermined power threshold. A load sense circuit 60 determines if the power drawn exceeds the predetermined threshold. The load sense circuit includes a current transformer 62 and a comparator 64. The current transformer 62 includes a primary winding that is connected in series with the lead 15c and a secondary winding that is connected to a pair of input terminals of the comparator 64. When the current drawn by the load 14 exceeds the power threshold, the voltage signal produced across the secondary winding of the current transformer causes the comparator 64 to transmit a load sense signal on the lead 66 to a control logic block 80, indicating that the predetermined power threshold has been exceeded. The magnitude of the predetermined power threshold is determined by the number of windings on the current transformer and the gain of the comparator 64 as is well known to those skilled in the art.

When the control logic block 80 receives the load sense signal from the load sense circuit 60, a logic signal is applied on a lead 82 to disable the flip-flops 42 and 44, thereby turning off the low power converter 40. When the low power converter 40 has been disabled, the control logic circuit 80 changes the state of a lead 154, thereby allowing a series of drive signals produced by the pulse width modulation circuit 100 to drive the high power converter 20. The high power converter causes current to be directed from the DC source 12 through a primary winding of transformer T1 in alternate directions to produce a 120-volt, 60 Hz AC output signal. Additionally, a bridge rectifier circuit 52 and capacitor 54 are driven by a tap on a secondary winding of transformer T1 to close the switch S1 when the high power converter 20 is on. As described above, the switch S1 preferably is implemented as a high current triac.

The pulse width modulation circuit 100 comprises a counter circuit 104 that is driven by a crystal oscillator 106 to produce four output signals having frequencies of 60 Hz, 120 Hz, 6 kHz, and 25 kHz. The 120 Hz signal is used to drive the flip-flops 42 and 44 within the low power converter 40 as described above. The 60 Hz and 6 kHz signals drive a sine wave reference generator 108 to produce a precision 60 Hz sine wave. The sine wave reference generator 108 is a switched capacitor filter whose operation is well known. The 60 Hz sine wave output of the sine wave reference generator 108 is fed into a noninverting input of an operational amplifier 110. The operational amplifier 110 includes a capacitor 109 and resistor 111 connected in parallel between the output of the amplifier 110 and an inverting input terminal of amplifier 110. Also connected to the inverting input terminal of the operational amplifier 110 is a signal proportional to the output voltage of the DC-to-AC converter 10 that is reduced in magnitude by a resistor 112, as well as an output signal from an operational amplifier 114. The operational amplifier 114 includes a resistor 124 and a capacitor 122 that are connected in parallel between an output terminal of amplifier 114 and a non-inverting input terminal, as well as a resistor 126 and capacitor 128 connected between an inverting input terminal and ground. A pair of leads 116 and a pair of matched resistors 118 and 120 couple the voltage on a primary winding 22 of the transformer T1 to the input terminals of the DC error amplifier 114. The operational amplifier 114 produces an output signal that is proportional to any DC voltage on the primary winding of transformer T1. The output signal is used to adjust the pulse width of the signals that drive the high power converter 20.

The output of the operational amplifier 110 is supplied to a noninverting input terminal of an operational amplifier 132 that is configured as an integrator. The 25 kHz square wave produced by the counter circuit 104 is supplied to the inverting input terminal of the operational amplifier 132 through a resistor 134. The output of the integrator circuit 132 is a 60 Hz precision sine wave that is modulated by a 25 kHz triangular wave. The magnitude of the output signal produced by the operational amplifier 132 is varied in proportion to the magnitude of the output signal from the operational amplifier 110. When the output voltage across leads 15b and 15c falls below 120 volts, the magnitude of the output signal from the operational amplifier 132 increases, while the magnitude of the output signal from the operational amplifier 132 decreases if the output voltage rises above 120 volts.

The modulated 60 Hz sine wave output signal produced by the integrator circuit 132 is supplied to a noninverting input terminal of a comparator 142 and an inverting terminal of a comparator 144. A first fixed reference voltage produced by a voltage divider circuit comprised of three resistors 136, 138 and 140 is applied to an inverting terminal of comparator 142. The reference voltage is connected to resistor 136, while the resistor 140 is connected to ground. The first reference voltage is taken at a node that joins resistor 136 to resistor 138. Similarly, a second reference voltage taken from a node that connects resistor 138 to resistor 140 is supplied to the noninverting terminal of the comparator 144. The outputs of comparators 142 and 144 are applied to inputs of two AND gates 150 and 152. Another pair of inputs to the AND gates 150, 152 receives an enable signal from the control logic circuit 80 on a lead 154. By supplying the enable signal on the lead 154, the output signals of the comparators 142 and 144 are allowed to reach four driver circuits 156, 158, 160 and 162. When the level of lead 154 is a logic low, the high power converter 20 is disabled. The outputs of driver circuits 158 and 162 are inverted such that when the outputs of comparators 142 and 144 are high, the outputs of driver circuits 158 and 162 are low. The outputs of the driver circuits 156 and 160 are raised in voltage by two level shifters 170 and 172 in order to properly turn on two of the four solid state switches included in the high power converter 20. The four driver circuits 156–162 produce a series of pulse width modulated signals that drive the solid state switches included in the high power converter 20 to produce a 60 Hz sine wave signal across the output leads 15b and 15c of the DC-to-AC power converter 10, as will be further described below.

Also included in the DC-to-AC converter 10 according to the present invention is an over-current comparator 180. A pair of input terminals of the over-current comparator 180 are connected through two resistors 184 and 186 to two sides of a fuse 182. Should the voltage across the fuse 182 exceed a predetermined threshold determined by a reference voltage and resistor 188, the over-current comparator 180 supplies a signal to an over-current input of the control logic circuit 80 that is used to shut down the DC-to-AC converter by providing a disabling output on lead 15a to the AND gates 150 and 152 before the fuse 182 opens. Also included in the DC-to-AC converter is an under-voltage comparator 190 that monitors the voltage across the DC source 12. If the voltage at the inverting terminal drops below a predetermined level, a non-inverting input terminal at the under-voltage comparator 190 is connected to a reference voltage. An inverting input terminal of the under-voltage comparator is connected to a voltage divider that includes two resistors 192 and 194. A logic signal is applied to a low battery input of the control logic block 80 to indicate the DC source is running out of power.

Figure 3:
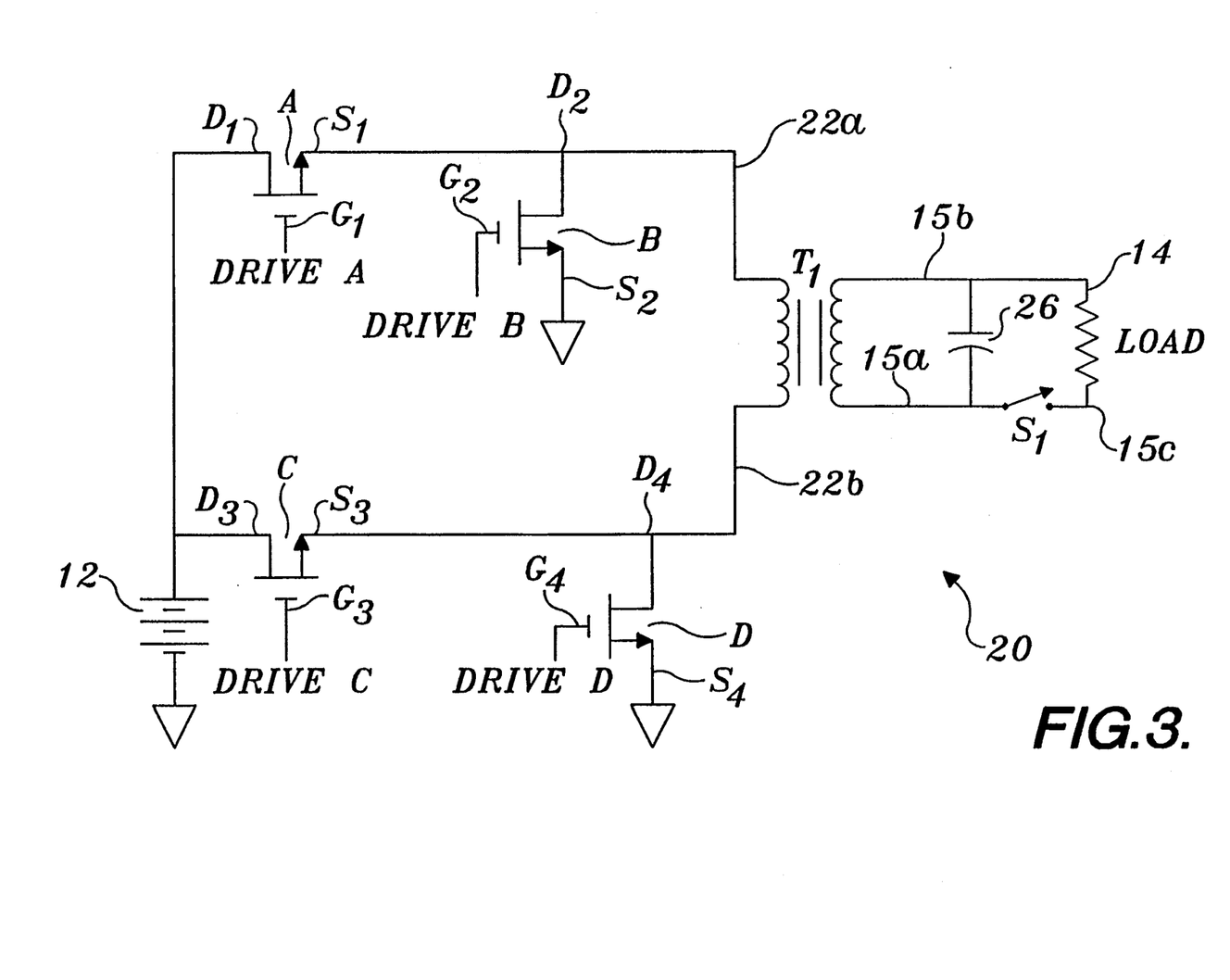
FIG. 3 is a circuit diagram of a switching circuit included in a high power DC-to-AC converter that produces a 120-volt AC voltage signal from a DC voltage source.

Turning now to FIG. 3, a more detailed diagram of the high power converter 20 according to the present invention is shown. The high power converter 20 comprises four solid state switches A, B, C and D that are controlled by the pulse width modulation circuit 100 to produce a 120-volt, 60 Hz AC voltage signal. The solid state switches A, B, C and D preferably comprise field-effect transistors (FETs). However, other types of solid state devices could be used. Switch A has a drain $D_1$ connected to the positive terminal of the DC source 12 and a source $S_1$ connected to a node 22a on a primary winding of a transformer T1. Switch B has a drain $D_2$ connected to the node 22a and a source $S_2$ connected to ground. Switch C has a drain $D_3$ connected to the positive terminal of the DC source 12 and a source $S_3$ connected to a node 22b on the primary winding of transformer T1, while switch D has a drain $D_4$ connected to node 22b and a source $S_4$ connected to ground. Nodes 22a and 22b are located on opposite sides of the primary winding of transformer T1.

In operation, to create a positive waveform on the output voltage (i.e., across leads 15a and 15b), the gates of switches A and D are biased by the drivers 156, 162 of the pulse width modulation circuit 100 to conduct current from the DC source 12 to node 22a, through the primary winding of transformer T1 to node 22b and finally to ground. To create a negative-going waveform on the output voltage, the gates of switches A and D are biased off and the switches C and B are biased by the drivers 160, 158 of the pulse width modulation circuit 100 to conduct current from the DC source to node 22b, through the transformer T1 to node 22a and finally to ground. As will be appreciated, the switches A and D and the switches C and B operate together to alternately create positive- and negative-going peaks on the output voltage waveform. Connected across the leads 15a and 15b of transformer T1 is a capacitor 26 that smoothes the output voltage delivered to the load 14. The configuration of the high power transformer 20 allows isolation between the DC source 12 and the load 14.

Figure 4:
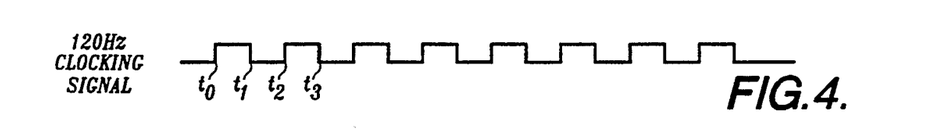
FIG. 4 is a timing diagram of a 120 Hz clocking signal that drives a low power converter included in the DC-to-AC power converter according to the present invention.
Figure 5:
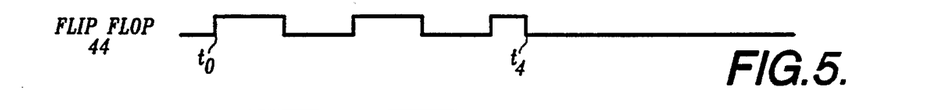
FIG. 5 is a timing diagram of an output of a first flip-flop included in the low power converter.
Figure 6:
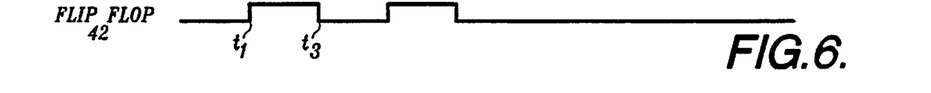
FIG. 6 is a timing diagram of an output of a second flip-flop included in the low power converter.
Figure 7:
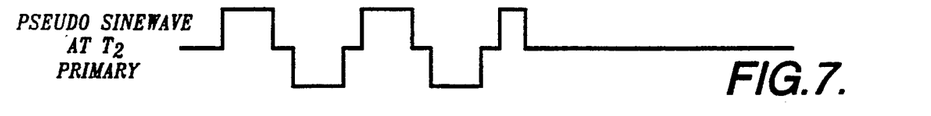
FIG. 7 is a graph of a pseudosine wave produced by the low power converter.

To illustrate how the low power and high power converters operate to produce a continuous 120-volt AC output signal, FIGS. 4–14 show the timing relationship of several different waveforms throughout the DC-to-AC converter. FIG. 4 shows the 120 Hz clocking signal produced by the counter circuit 104. On each rising edge of the 120 Hz signal indicated, for example, by times $t_0$ and $t_2$, the state of flip-flop 44 changes as shown in FIG. 5. Similarly, upon each falling edge of the 120 Hz signal shown at times $t_1$ and $t_3$, the state of flip-flop 42 changes as shown in FIG. 6. As can be seen, the output of flip-flop 42 lags the output of flip-flop 44 by 90°. FIG. 7 shows a graph of the pseudosine wave produced by the two flip-flops directing current in alternate directions through the primary winding of transformer T2. The pseudosine wave has a magnitude of 120-volts and a frequency of 60 Hz. As described above, the output voltage of the low power converter appears across leads 15b and 15c and can be used to drive low power loads or start high power loads. Additionally, the energy required by the low power converter to produce the output signal shown in FIG. 7 is minimal, thereby conserving battery power when little power is being drawn.

Figure 8:
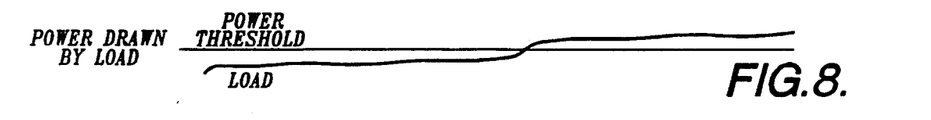
FIG. 8 is a graph showing how a load sense circuit determines if a load is drawing more than a predetermined level of power.
Figure 9:
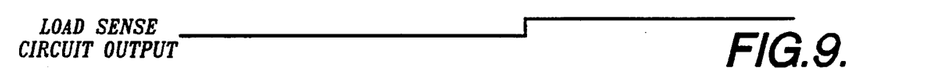
FIG. 9 is a timing diagram of a load sense signal transmitted from the load sense circuit to a control circuit.
Figure 10:
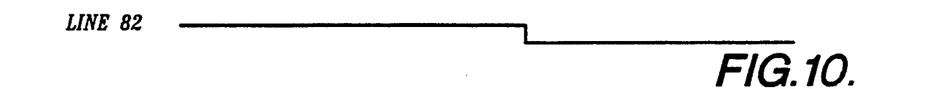
FIG. 10 is a timing diagram of a reset signal that halts the operation of the low power converter.
Figure 11:
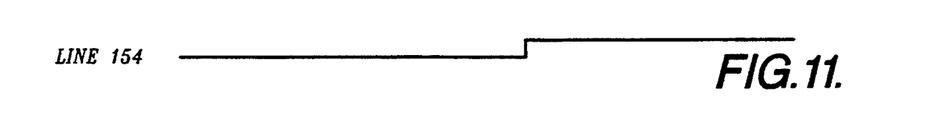
FIG. 11 is a timing diagram of a signal that turns on the high power converter included in the DC-to-AC converter according to the present invention.

FIG. 8 shows a graph of the output of the load sense circuit as the load drawn by the current rises and eventually exceeds the predetermined power threshold. At a time 14, the power drawn by the load exceeds the threshold, and the load sense signal transmitted from the load sense circuit to the control logic block 80 goes high, as is shown in FIG. 9. As soon as the control block receives the load sense signal from the load sense circuit, the level of line 82 drops, thereby disabling the two flip-flops 42, 44 as shown in FIG. 10. This can be seen also in FIG. 5 wherein the operation of the flip-flop 44 is halted at time $t_4$. FIG. 11 shows the logic level of line 154, which extends from the control logic block 80 to the AND gates 150, 152 shown in FIG. 2. At time 14, the logic level goes high, thereby enabling the AND gates and allowing the pulse width modulation signals from the comparators 142, 144 to reach the driver circuits 156–162. When the logic level of the signal on line 154 is high, the high power converter 20 begins providing power to the load.

Figure 12:
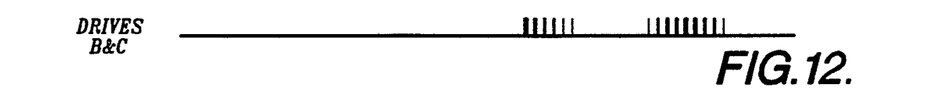
FIG. 12 is a timing diagram of a drive C and a drive D signal produced by a pulse width modulation circuit included in the DC-to-AC converter according to the present invention.
Figure 13:
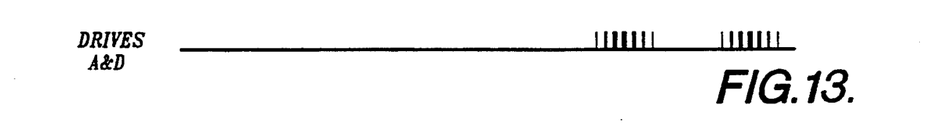
FIG. 13 is a timing diagram of a drive A and a drive B signal produced by the pulse width modulation circuit.

FIGS. 12 and 13 show the drive signals used to power the four switches A, B, C, and D shown in FIG. 3. Each of the pulse width modulation signals comprises a series of pulses having a width that increases to a maximum and decreases during a given half waveform of the output 60 Hz signal, as is well known to those skilled in the art.

Figure 14:
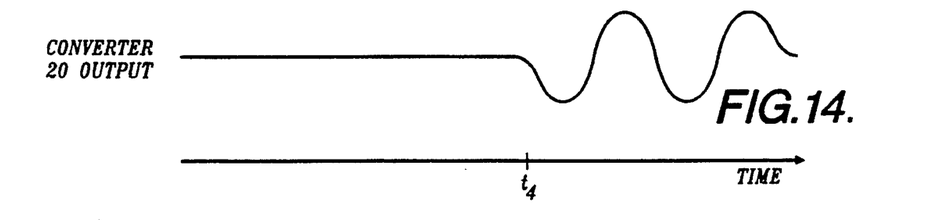
FIG. 14 is a graph of a 120-volt 60 Hz output signal produced by the high power converter.

FIG. 14 shows a graph of the output signal produced by the high power converter 20. As can be seen, the high power converter begins producing the output signal at time $t_4$ when the load sense circuit determines that the threshold value of power drawn by the load has been exceeded. Combining FIGS. 7 and 14, it can be seen that there is only a minimum interruption when the low power converter is turned off and the high power converter is turned on. Therefore, the static DC-to-AC converter of the present invention operates to conserve energy when there is no load or only a light load drawing current. However, as soon as the load draws more than the predetermined level of power, the high power converter is turned on and the low power converter is turned off.

Although the present invention has been described with respect to its preferred embodiment, those skilled in the art will realize that changes could be made without departing from the scope and spirit of the invention. Therefore, it is intended that the scope be determined solely from the following claims.

The embodiments of the invention in which an exclusive property or privilege is claimed are defined as follows:

1. A DC-to-AC power converter for providing an AC output signal to a load from a DC voltage source, comprising:
   a first, high power, DC-to-AC converter coupled to the DC voltage source for producing a first, high power, AC output signal;
   a second, low power, DC-to-AC converter source for producing a second, low power, AC output signal, wherein the second, low power, DC-to-AC converter produces a continuous, low power, AC output signal even if no load is present;

switch means for connecting either the first, high power, AC output signal to the load or the second, low power, AC output signal to the load;

power monitoring means for monitoring power drawn by the load and for producing a signal if the load draws more than a predetermined level of power; and control circuit means for receiving the signal from the power monitoring means, and for causing the switch means to disconnect the second, low power, AC output signal from the load and to connect the first, high power, AC output signal to the load when the control circuit means receives the signal from the power monitoring means.

2. The DC-to-AC power converter of claim 1, further comprising:

a pulse width modulation circuit that drives the first, high power, DC-to-AC converter to produce a high power 120-volt, 60 Hz AC output signal.

3. A DC-to-AC power converter for producing an AC signal from a DC voltage source, comprising:

a first DC-to-AC converter for producing a first AC signal, including:
(a) a first transformer having a primary winding and a secondary winding;
(b) first switch means connected to conduct current from the DC source to the primary winding of the first transformer;
(c) second switch means connected between the primary winding and a ground potential, said first and second switch means being located on opposite sides of the primary winding of the first transformer;
(d) third switch means connected to conduct current from the DC source to the primary winding of the first transformer;
(e) fourth switch means connected between the primary winding and a ground potential, wherein said third and fourth switch means are located on opposite sides of the primary winding; and
(f) pulse width modulation means for controlling the first, second, third and fourth switch means so that the first AC signal is produced on the secondary winding of the first transformer;

a second DC-to-AC converter for producing a second AC signal, including:
(g) a second transformer having a primary winding and a secondary winding;
(h) means for producing a first 60 Hz signal; and
(i) means for producing a second 60 Hz signal that is out of phase with the first 60 Hz signal, wherein the primary winding of the second transformer is connected to the means for producing the first 60 Hz signal and the means for producing the second 60 Hz signal, said means for producing a first 60 Hz signal and the means for producing a second 60 Hz signal being operable to conduct a current through the primary winding of the second transformer in alternate directions;

power monitoring means for producing a load sense signal when the level of power drawn by a load exceeds a predetermined threshold, including:

(j) a load sense transformer that produces a signal proportional to a level of power drawn by the load;
(k) a comparator for comparing the signal with a threshold value and for producing a load sense signal when the power drawn by the load exceeds the threshold value; and
(l) switching means that are responsive to the load sense signal for connecting the first AC signal to the load and disconnecting the second AC signal from the load when the comparator produces the load sense signal.

4. A method of providing a load with an AC voltage signal from a DC voltage source, comprising the steps of:

producing a low power AC voltage signal from the DC voltage source by:
(a) providing an input clocking signal to a first and a second flip-flop such that the first and the second flip-flop change states alternately in time; and
(b) connecting an output of the first and second flip-flop to a transformer to conduct a current through the transformer in alternate directions as the first and the second flip-flop change states;
(c) providing an input clocking signal to a first and second flip-flop such that the first and the second flip-flop change states alternately in time; and
(d) connecting an output of the first and second flip-flop to a transformer to conduct a current through the transformer in alternate directions as the first and the second flip-flop change states;

connecting the low power AC voltage signal to the load;

monitoring the level of power drawn by the load;

determining if the level of power drawn by the load exceeds a predetermined threshold; and producing a high power AC voltage signal from the DC voltage source, disconnecting the low power AC voltage signal from the load and connecting the high power AC voltage signal to the load when the level of power drawn by the load exceeds the predetermined threshold.

5. A DC-to-AC power converter for providing an AC output signal to a load from a DC voltage source., comprising:

a first, high power, DC-to-AC converter coupled to the DC voltage source for producing a first, high power, AC output signal;

a second, low power, DC-to-AC converter source for producing a second, low power, AC output signal; the second, low power, DC-to-AC converter comprising:

a transformer having a primary winding and a secondary winding;

means for producing a first 60 Hz signal;

means for producing a second 60 Hz signal that is out of phase with the first 60 Hz signal;

wherein the primary winding of the transformer is connected to the means for producing the first 60 Hz signal and the means for producing the second 60 Hz signal, said means for producing a first 60 Hz signal and said means for producing a second 60 Hz signal being operable to conduct a current through the primary winding in alternate directions;

switch means for connecting either the first, high power, AC output signal to the load or the second, low power, AC output signal to the load;

power monitoring means for monitoring power drawn by the load and for producing a signal if the load draws more than a predetermined level of power; and control circuit means for receiving the signal from the power monitoring means, for causing the switch means to disconnect the second, low power, AC output signal from the load, and to connect the first, high power, AC output signal to the load when the control circuit means receives the signal from the power monitoring means.

6. The DC-to-AC power converter as in claim 5, wherein the means for producing the first and second 60 Hz signals comprise:

a first flip-flop connected to change states each time it receives a clock input;

a second flip-flop connected to change states each time it receives a clock input; and means for providing out-of-phase clock inputs to the first and second flip-flops.

7. The DC-to-AC power converter as in claim 6, wherein the means for providing out-of-phase clock inputs to the first and second flip-flops comprise:

a source of a 120 Hz clocking signal;

means for producing an inverted 120 Hz clocking signal;

means for connecting the 120 Hz clocking signal to one of the first and second flip-flops; and means for connecting the inverted 120 Hz clocking signal to the other of the first and second flip-flops.

* * * * *